US012690950B2

(12) United States Patent

Heidarpour

(10) Patent No.: US 12,690,950 B2

(45) Date of Patent: Jul. 28, 2026

(54) COMBINED SELF-LIGATING BRACKET-ALIGNER ORTHODONTIC APPLIANCE, METHOD OF MANUFACTURING, AND TREATMENT USING THE APPLIANCE

(71) Applicant: Majid Heidarpour, Boston, MA (US)

(72) Inventor: Majid Heidarpour, Boston, MA (US)

(73) Assignee: CROSSTEK ORTHODONTICS, Rockford, IL (US)

( * ) Notice: Subject to any disclaimer, the term of this patent is extended or adjusted under 35 U.S.C. 154(b) by 113 days.

(21) Appl. No.: 18/417,384

(22) Filed: Jan. 19, 2024

(65) Prior Publication Data

US 2025/0235293 A1 Jul. 24, 2025

(51) Int. Cl.
*A61C 7/28* (2006.01)

(52) U.S. Cl.
CPC ........ *A61C 7/287* (2013.01); *A61C 2201/007* (2013.01)

(58) Field of Classification Search
CPC .............. A61C 7/08; A61C 7/14; A61C 7/287
See application file for complete search history.

(56) References Cited

U.S. PATENT DOCUMENTS

| | | | | |
|---|---|---|---|---|
| 4,856,991 A * | 8/1989 | Breads | A61C 7/125 433/24 |
| 7,374,421 B2 * | 5/2008 | Solomon | A61C 7/08 433/18 |
| 9,022,781 B2 * | 5/2015 | Kuo | A61C 7/20 433/24 |
| 2004/0072117 A1 * | 4/2004 | Farzin-Nia | A61C 7/20 433/10 |
| 2009/0325120 A1 * | 12/2009 | Lewis | A61C 7/287 433/13 |
| 2013/0029283 A1 * | 1/2013 | Matty | A61C 7/002 700/98 |
| 2014/0272753 A1 * | 9/2014 | Sommer | A61C 7/287 433/11 |
| 2020/0330190 A1 * | 10/2020 | Kwon | A61C 7/287 |
| 2025/0235293 A1 * | 7/2025 | Heidarpour | A61C 7/287 |

* cited by examiner

*Primary Examiner* — Ralph A Lewis
(74) *Attorney, Agent, or Firm* — FALATI IP LAW FIRM

(57) ABSTRACT

The present invention discloses a combined self-ligating bracket-aligner orthodontic appliance, and a method of manufacturing and treatment using orthodontic appliance. The appliance comprises at least one self-ligating bracket configured to attach to a tooth and at least one aligner placed above the self-ligating bracket. The bracket comprises a body portion having a rear side proximal to a gumline, a front side opposite to the rear side, a top side, a bottom side opposite to the top side and two opposing side edges. An archwire slot formed transversely across the body portion from the first side of the body portion to an interior portion of the body portion, and across the two opposing side edges. A gate disposed at the front side across the slot to open and close the slot the front side of the bracket.

16 Claims, 20 Drawing Sheets

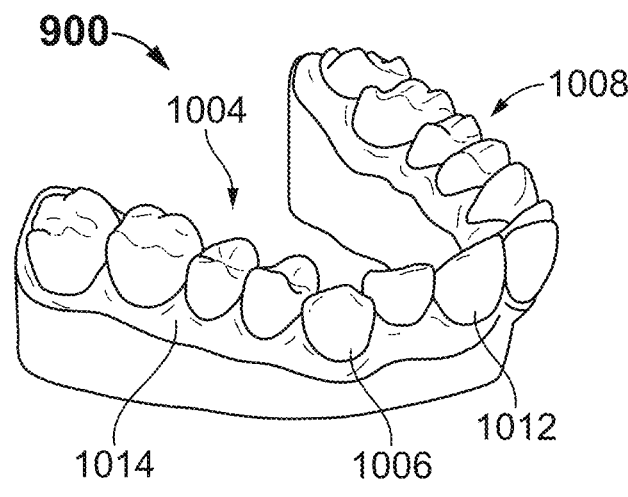
FIG. 11A
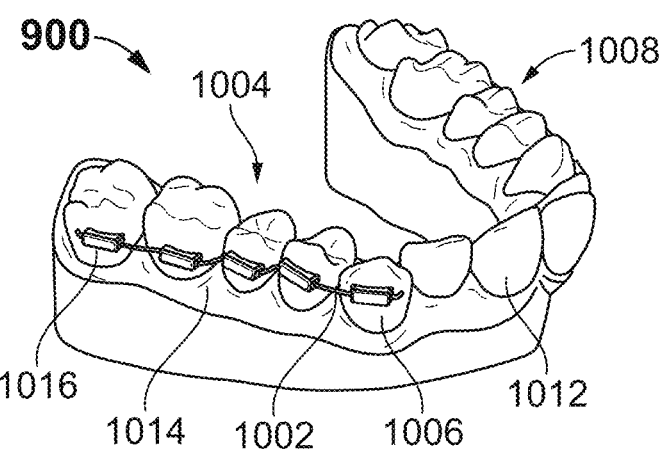
FIG. 11B
FIG. 11C

1002

1014

1010

1012

1010

900

900

—1310

—1308

—1316

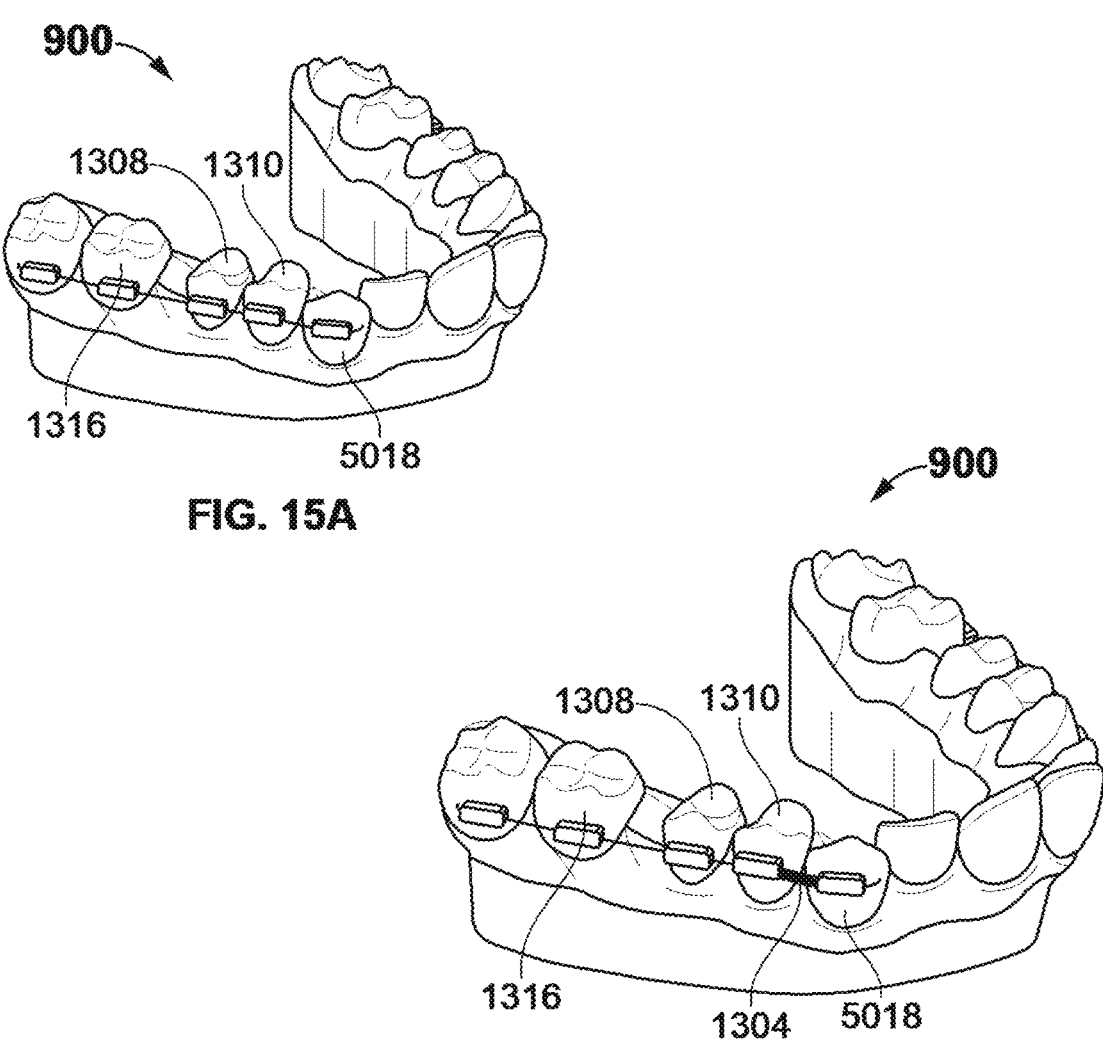
FIG. 15A
FIG. 15B
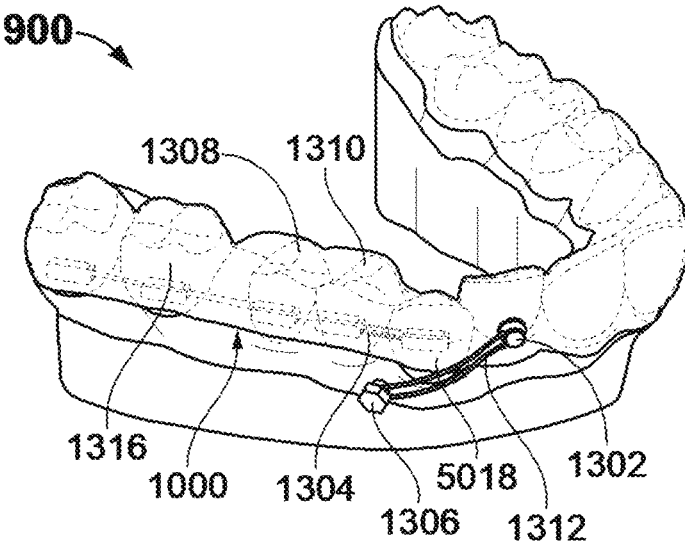
FIG. 15C

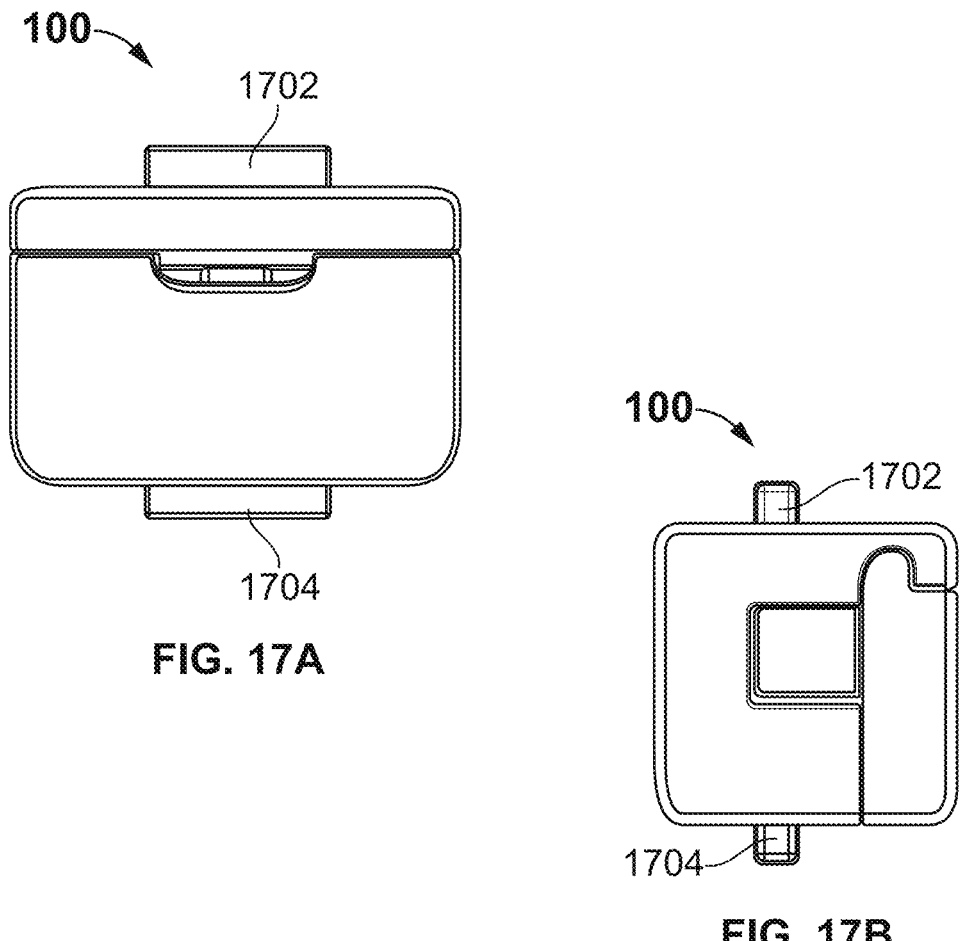
FIG. 17A
FIG. 17B
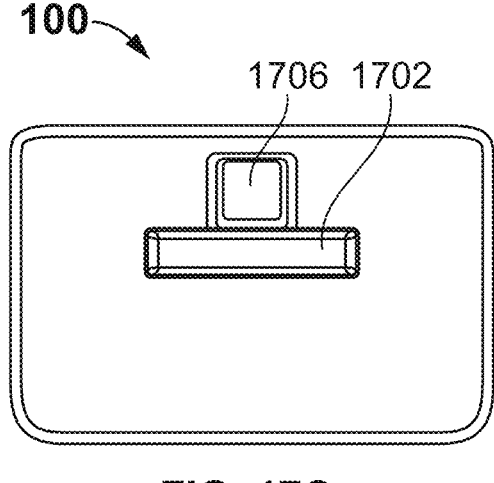
FIG. 17C

COMBINED SELF-LIGATING BRACKET-ALIGNER ORTHODONTIC APPLIANCE, METHOD OF MANUFACTURING, AND TREATMENT USING THE APPLIANCE

BACKGROUND OF THE INVENTION

Orthodontic treatment using aligners is aimed at straightening and aligning teeth to improve their positioning and overall tooth movement. One of the difficulties of orthodontic treatment by aligners is the bodily mesiodistal movement of posterior teeth. Trying to move the posterior teeth using the aligners, even with more advanced attachments would cause tipping of these teeth.

Currently, some clinicians combine conventional orthodontic attachments with the aligners by cutting some windows in them. Examples of this combination are adding lingual buttons or cleats to help rotational movements, bonding power arms to enhance bodily movement of individual teeth or bonding mini tubes to the teeth to speed alignment and leveling in small arch segments. This will limit the space needed for bonding the aligner attachments and does not provide the three-dimensional control of the edgewise bracket slot. In addition, it may weaken the aligner itself and decrease the biomechanical properties of its structure.

Therefore, there is a need for an orthodontic appliance and method for significantly improving the bodily movement of posterior teeth reducing mesiodistal tipping by providing three-dimensional control over the teeth.

SUMMARY OF THE INVENTION

The present invention discloses a combined self-ligating bracket-aligner orthodontic appliance, and a method of manufacturing and treatment using said orthodontic appliance. The appliance comprises at least one self-ligating bracket configured to attach to a tooth and at least one aligner placed above the self-ligating bracket. The bracket comprises a body portion having a rear side proximal to a gumline, a front side opposite to the rear side, a top side, a bottom side opposite to the top side and two opposing sides.

The bracket further comprises an archwire slot formed transversely across the body portion from the first side of the body portion to an interior portion of the body portion, and across the two opposing side edges. In one embodiment, the slot has a rectangular cross-section. In one embodiment, the bracket is made of any tooth-colored biocompatible material like plastic or composite. The self-ligating bracket further comprises a gate disposed at the front side across the slot to open and close the slot the front side of the bracket.

One aspect of the present disclosure is directed to a combined self-ligating bracket-aligner orthodontic appliance, comprising (a) at least one self-ligating bracket configured to attach to a tooth having: (i) a body portion having a rear side proximal to a gumline, a front side opposite to the rear side, a top side, a bottom side opposite to the top side and two opposing side edges; (ii) an archwire slot formed transversely across the body portion from the first side of the body portion to an interior portion of the body portion, and across the two opposing side edges; and (iii) a gate disposed at the front side across the slot to open and close the slot and the front side of the bracket; and (b) at least one aligner placed above the self-ligating bracket.

In one embodiment, the archwire slot has a rectangular cross section. In one embodiment, the bracket is made of a tooth-colored biocompatible plastic or composite. In one embodiment, the gate comprises an interior surface contacting the front side of the bracket, wherein the gate comprises a slot at the interior surface and a front side of the bracket comprises a protrusion complementary to the slot to enable the gate to slide over the front side of the bracket to open and close the archwire slot. In a related embodiment, the slot and protrusion have a T-shaped configuration. In another related embodiment, the slot having a first depth at a top portion of the slot and a second depth at a bottom portion of the slot, wherein the first depth is smaller than the second depth, and wherein the bracket further comprises an active, flexible cantilever spring formed over the protrusion. In one embodiment, the cantilever spring is made of Nickel-Titanium (NiTi) material or any flexible material.

In one embodiment of the orthodontic appliance, the gate is slid downwards to open the transverse slot, the top portion having the first depth configured to flex the cantilever spring holds the gate in open portion. In a related embodiment, the gate is slid upwards to close the transverse, the bottom portion having the second depth enable to relax and extend the cantilever spring, while a protuberance at the top portion of the slot lies over the cantilever spring enabling it to close the gate. In one embodiment, the orthodontic appliance further comprises at least two spaced apart ridges extends from a top side of the gate and at least two spaced apart grooves formed at a top interior side of the body portion, wherein the ridges are complementary to the grooves, wherein the ridges are configured to interlock with the grooves to provide stabilization to gate when the gate is closed.

In one embodiment, the orthodontic appliance further comprises at least one occlusal wing extending from the top side of the body portion. In another embodiment, the orthodontic appliance further comprises at least one gingival wing extending from a bottom side of the body portion. In another embodiment of the orthodontic appliance, the appliance further comprises a vertical slot to use orthodontic auxiliaries. In one embodiment, the orthodontic auxiliaries include elastic modules and hooks.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

BRIEF DESCRIPTION OF DRAWINGS

Figures 9, 10A, 10B:
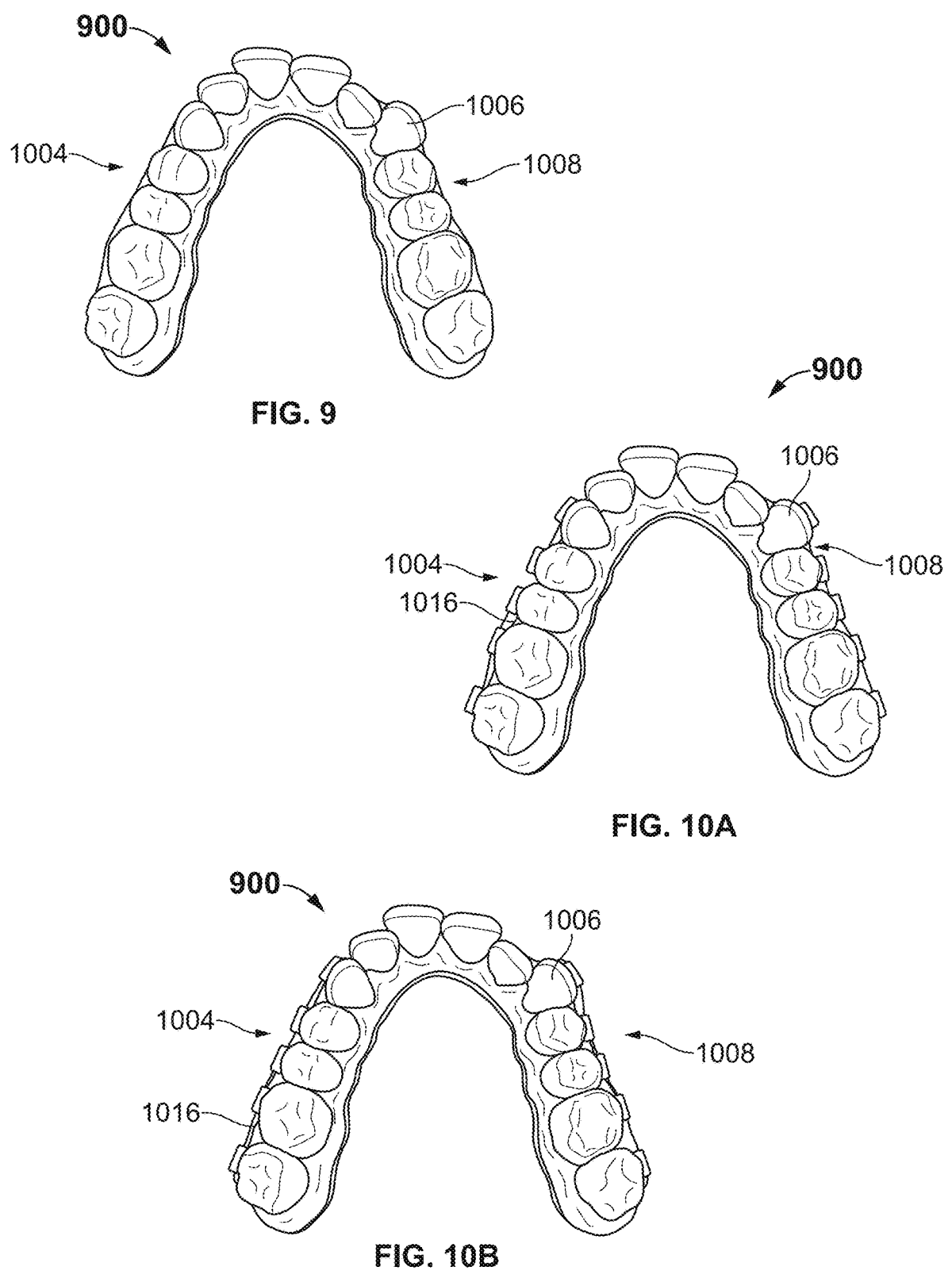

FIG. 9 exemplarily illustrates a schematic diagram of the occlusal view of the malocclusion model.

FIG. 10A exemplarily illustrates a schematic diagram of the occlusal view, where the brackets are placed on the posterior teeth and canines.

FIG. 10B exemplarily illustrates a schematic diagram of the occlusal view of the active wire placed inside the bracket slot.

FIG. 11A exemplarily illustrates a schematic diagram of the buccal view of the malocclusion model.

FIG. 11B exemplarily illustrates a schematic diagram of the buccal view of the brackets placed on the posterior teeth and canines.

FIG. 11C exemplarily illustrates a schematic diagram of the buccal view of the active wire placed inside the bracket slots.

FIG. 15A exemplarily illustrates a schematic diagram of the oblique view of distalization stage of premolars in which posterior teeth are aligned and leveled with all the brackets aligned straight.

FIG. 15B exemplarily illustrates a schematic diagram of the oblique view of push coil being placed between the upper 1st premolar and canine.

FIG. 15C exemplarily illustrates a schematic diagram of the oblique view of the mini-screw placed mesial to the upper 1st premolar to reinforce the anterior anchorage.

US 12,690,950 B2

5

Figure 17D:
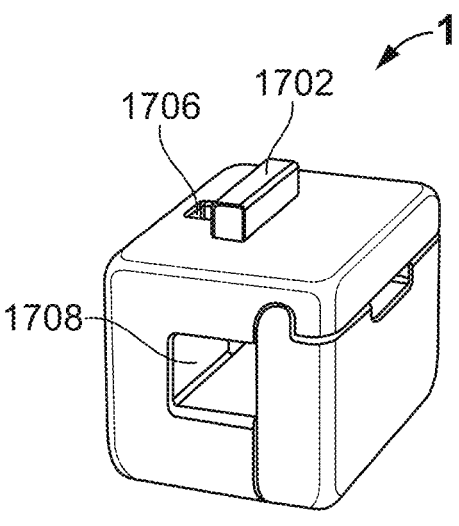
FIG. 17A exemplarily illustrates a schematic diagram of the buccal view of the bracket with occlusal and gingival wings.
FIG. 17B exemplarily illustrates a schematic diagram of the mesial view of the bracket with occlusal and gingival wings.
FIG. 17C exemplarily illustrates a schematic diagram of occlusal view of the bracket with vertical slot and gingival and occlusal wings.

FIG. 17D exemplarily illustrates a schematic diagram of oblique view of the bracket with vertical slot and occlusal and gingival wings.

Figure 17E:
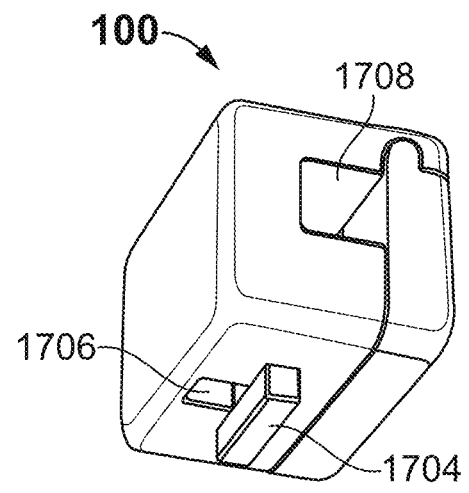

FIG. 17E exemplarily illustrates a schematic diagram of the gingival view of the bracket with gingival wing and vertical slot.

Figure 17F:
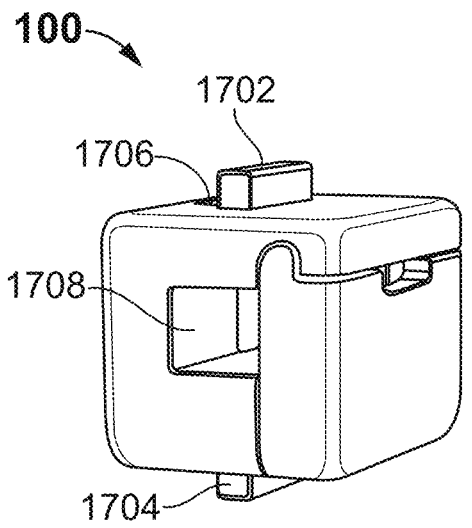

FIG. 17F exemplarily illustrates a schematic diagram of the buccal boundary of the vertical slot is flush with the horizontal slot.

Figure 17G:
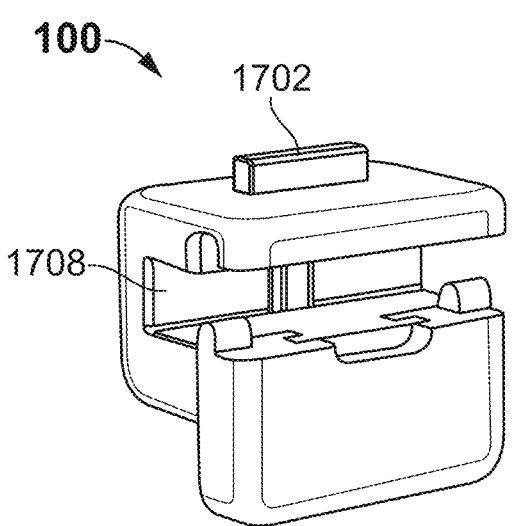

FIG. 17G exemplarily illustrates a schematic diagram of the buccal view of the bracket with the sliding gate open.

DETAILED DESCRIPTION

The present invention proposes a combined self-ligating bracket-aligner orthodontic appliance, and a method of manufacturing and treatment using said orthodontic appliance. The appliance significantly improves the bodily movement of posterior teeth, reducing mesiodistal movement by providing three-dimensional control over the teeth during orthodontic treatment.

A description of embodiments of the present disclosure will now be given with reference to the figures. It is expected that the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

Before any embodiments of the invention are explained in detail, it is to be understood that the disclosure is not limited in its application to the details of construction nor to the arrangement of components set forth in the following description or illustrated in the drawings. The disclosure is capable of other embodiments and of being practiced or of being carried out in various ways.

The present invention discloses a combined self-ligating bracket-aligner orthodontic appliance, and a method of manufacturing and treatment using orthodontic appliance. The appliance comprises at least one self-ligating bracket configured to attach to a tooth and at least one aligner placed above the self-ligating bracket. The bracket comprises a body portion having a rear side proximal to a gumline, a front side opposite to the rear side, a top side, a bottom side opposite to the top side and two opposing side edges.

The bracket further comprises an archwire slot formed transversely across the body portion from the first side of the body portion to an interior portion of the body portion, and across the two opposing side edges. In one embodiment, the slot has a rectangular cross-section. In one embodiment, the bracket is made of any tooth-colored biocompatible material like plastic or composite. The self-ligating bracket further comprises a gate disposed at the front side across the slot to open and close the slot, the front side of the bracket.

The gate comprises an interior surface contacting the front side of the bracket. The gate further comprises a slot at the interior surface and a front side of the bracket comprises a protrusion complementary to the slot to enable the gate to slide over the front side of the bracket to open and close the archwire slot. The slot and protrusion have a T-shaped configuration. The slot has, in one embodiment, a first depth at a top portion of the slot and a second depth at a bottom portion of the slot. In one embodiment, the first depth is smaller than the second depth. The bracket further comprises an active, flexible cantilever spring formed over the protrusion. In one embodiment, the cantilever spring is made of Nickel Titanium (NiTi) material or any flexible material.

In one embodiment, when the gate is slid downwards to open the transverse slot, the top portion having the first depth configured to flex the cantilever spring holds the gate in open portion. Further, when the gate is slid upwards to close the transverse, the bottom portion having the second depth enable to relax and extend the cantilever spring, while a protuberance at the top portion of the slot lies over the cantilever spring enabling to close the gate.

The orthodontic appliance further comprises at least two spaced apart ridges extends from a top side of the gate and at least two spaced apart grooves formed at a top interior side of the body portion. The ridges are complementary to the grooves. The ridges are configured to interlock with the grooves to provide stabilization to gate when the gate is closed.

The orthodontic appliance further comprises at least one occlusal wing extends from the top side of the body portion. The orthodontic appliance further comprises at least one gingival wing extends from a bottom side of the body portion. The orthodontic appliance further comprises a vertical slot to use orthodontic auxiliaries. In one embodiment, the orthodontic auxiliaries include elastic modules and hooks.

Figure 1:
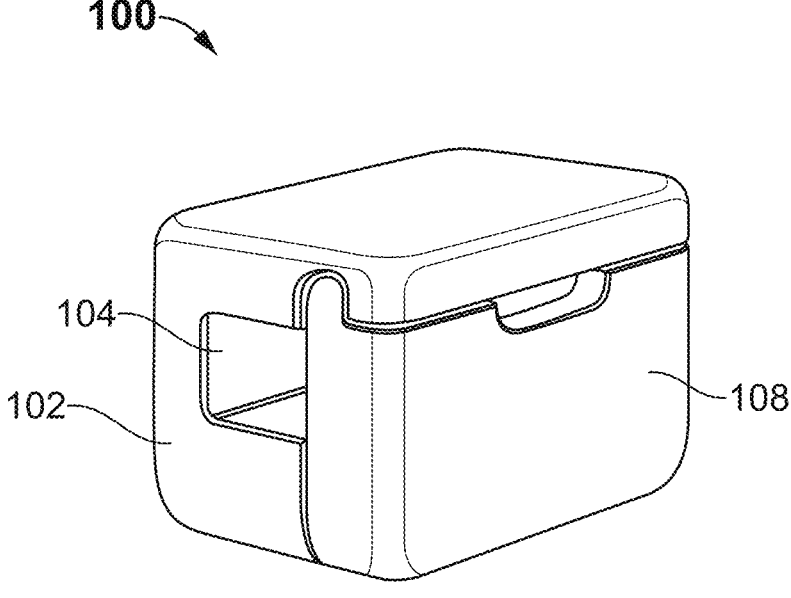
FIG. 1 exemplarily illustrates a schematic diagram of the oblique view of the bracket with the bracket gate closed.

FIG. 1 illustrates a schematic diagram of the oblique view of a self-ligating bracket 100 in which the outer surface can be an active site for force application by an aligner, i.e., they can be considered as attachments for the aligner. The bracket 100 is made of a tooth-colored biocompatible plastic or composites. As the bracket 100 is a self-ligating bracket, it can attach on teeth in a similar way as traditional metal braces. The brackets are bonded to the front surface of the teeth using an adhesive and the wire is inserted into the slots of the brackets.

The bracket 100 comprises a bracket body 102, bracket slot 104 and a bracket gate 108 in which bracket body 102 is configured to be mounted to teeth and has a rectangular slot called bracket slot 104. The bracket body 102 also referred as body portion and bracket slot 104 also referred as archwire slot. The bracket slot 104 is where active wires can apply orthodontal force by incorporating into the bracket slot 104. The bracket gate 108 is a rigid opening or closing structure of bracket slot 104 in an interlocking mechanism of the active wire into bracket slot 104.

Figure 2:
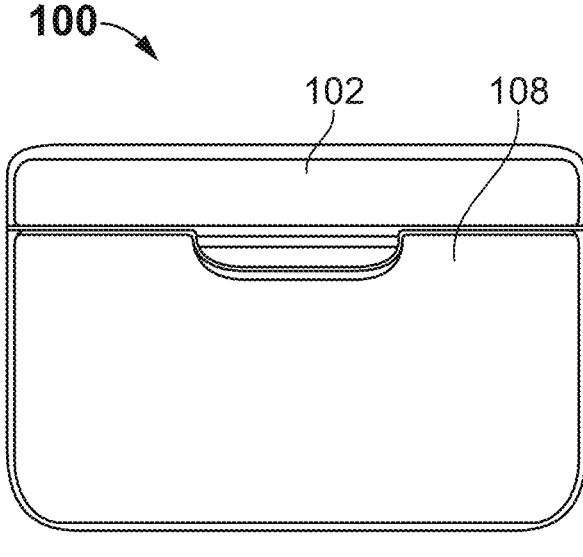
FIG. 2 exemplarily illustrates a schematic diagram of the buccal view of the bracket with the bracket gate closed.

FIG. 2 illustrates a schematic diagram of the buccal view of the self-ligating bracket 100 in which the bracket gate 108 is in the closed position.

Figure 3:
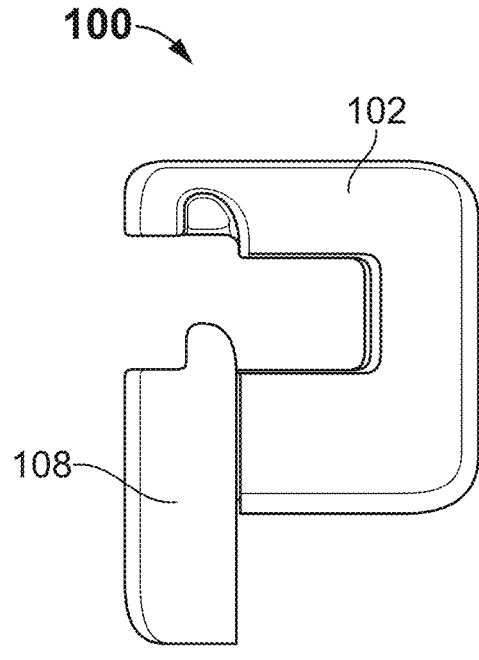
FIG. 3 exemplarily illustrates a schematic diagram of the side view of the bracket with the bracket gate open.

FIG. 3 illustrates a schematic diagram of the side view of the self-ligating bracket 100 in which bracket gate 108 is in the open position.

Figure 4:
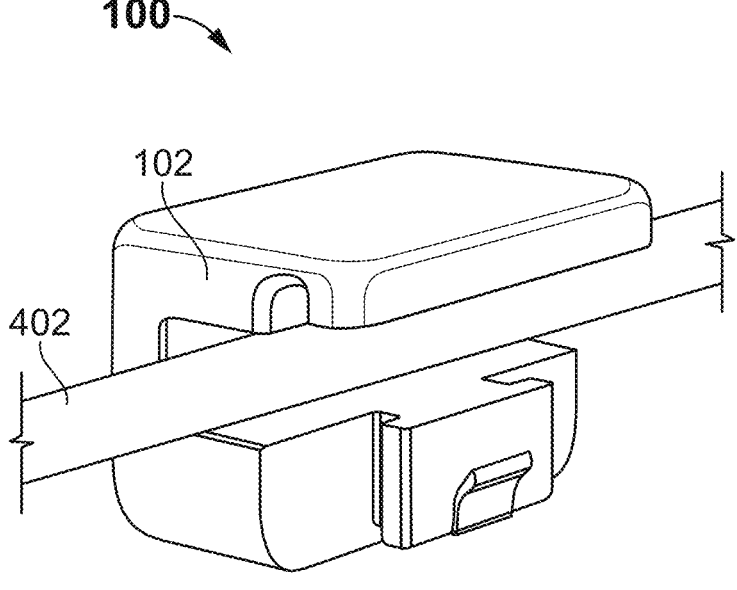
FIG. 4 exemplarily illustrates a schematic diagram of the bracket with the active wire inside the bracket slot.

FIG. 4 illustrates a schematic diagram of the self-ligating bracket 100 in which an active wire 402 is connected by inculpating into the bracket slot 104. The active wire 402 is also called an arch wire to be placed inside the teeth comfortably. The active wire 402 is made of different alloys such as Nickel-titanium (NiTi), stainless steel or beta-titanium. The active wire 402 is used for the initial levelling and alignment of the teeth due to the flexible nature of the alloy composition such as optimal elasticity, low stiffness, high flexibility, and high spring nature. The active wire 402 is also flexible enough to move the teeth.

Figures 5A, 5B, 5C:
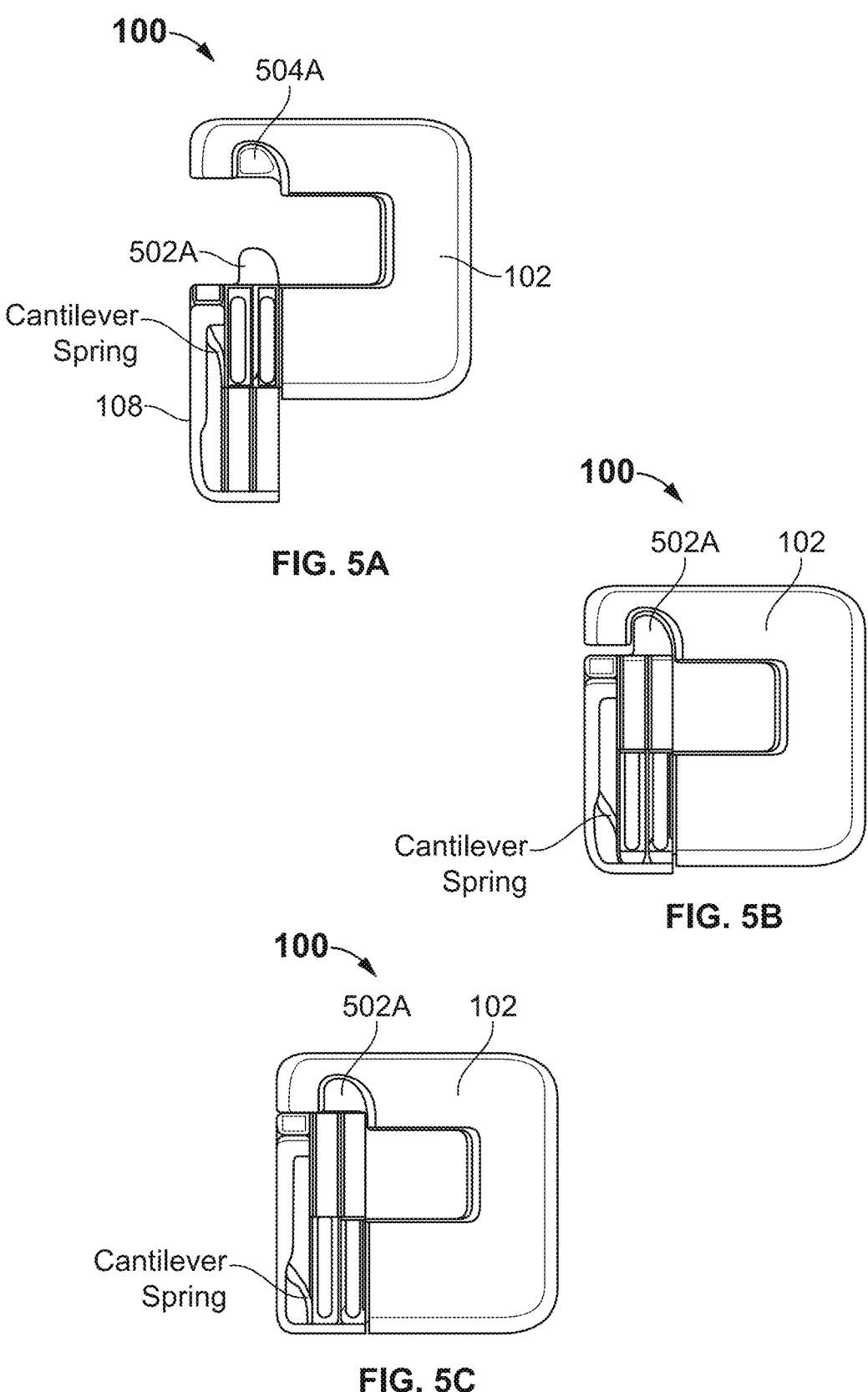
FIG. 5A exemplarily illustrates a schematic diagram of the cross-section of the interlocking mechanism of the bracket gate in the open position.
FIG. 5B exemplarily illustrates a schematic diagram of the cross-section of the interlocking mechanism of the bracket gate in the semi-closed position.
FIG. 5C exemplarily illustrates a schematic diagram of the cross-section of the interlocking mechanism of the bracket gate in the closed position.

FIG. 5A to 5C illustrate schematic diagrams of the cross-section view of the interlocking mechanism of the bracket gate 108 in its open position, semi-closed position and closed position respectively. The bracket gate 108 can be opened and closed by sliding through two notches/ridges (502 *a* and 502 *b*) on both sides of the bracket body 102. In addition, it has two small interlocking spurs/grooves (504 *a* and 502 *b*) positioned in the two corresponding notches (502 *a* and 502 *b*) on both sides of the bracket body 102. The spurs (504 *a* and 504 *b*) stabilize the bracket gate 108 in the closed position. The bracket 100 further comprises an active, flexible cantilever spring formed over the protrusion. In one embodiment, the cantilever spring is made of Nickel Titanium NiTi) material or any flexible material. In one embodiment, when the bracket gate 108 is slid downwards to open the transverse slot, the top portion having the first depth configured to flex the cantilever spring holds the bracket gate 108 in open portion. Further, when the bracket gate 108 is slid upwards to close the transverse, the bottom portion having the second depth enable to relax and extend the cantilever spring, while a protuberance at the top portion of the slot lies over the cantilever spring enabling to close the bracket gate 108.

Figure 6:
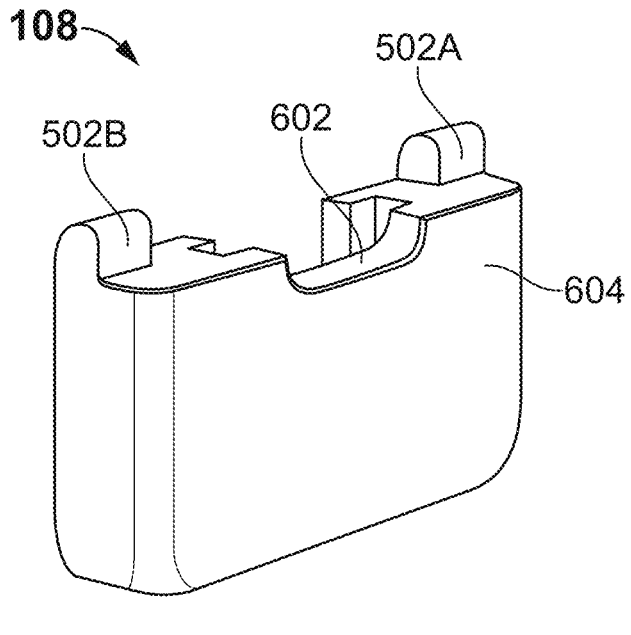
FIG. 6 exemplarily illustrates a schematic diagram of the bracket gate with sliding grooves on the interior surface.

FIG. 6 illustrates a schematic diagram of bracket gate 108 having sliding grooves 602 disposed on the interior surface. The rigid bracket gate 108 closes the open side of the bracket and/or opens the closed bracket by using sliding grooves 602. The sliding grooves 602 are extending in the occlusal-gingival direction at opposed mesial-distal ends of support surface 604. The pair of notches (502*a* and 502*b*) are carried by support surface 604 and are positioned on respective mesial and distal sides. The support surface 604 including sliding groove 602 and notches (502*a* and 502*b*) collectively define a slide engagement track for supporting and guiding ligating slide within bracket body 102. The whole bracket body 102 is attached to the tooth by means of adhesive.

Figure 7A:
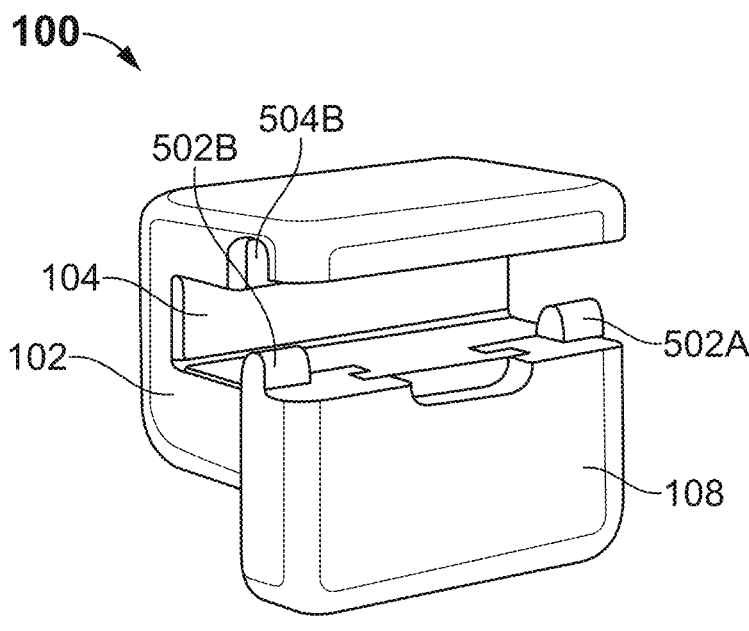
FIG. 7A exemplarily illustrates a schematic diagram of the oblique view of the bracket gate in the open position.
Figure 7B:
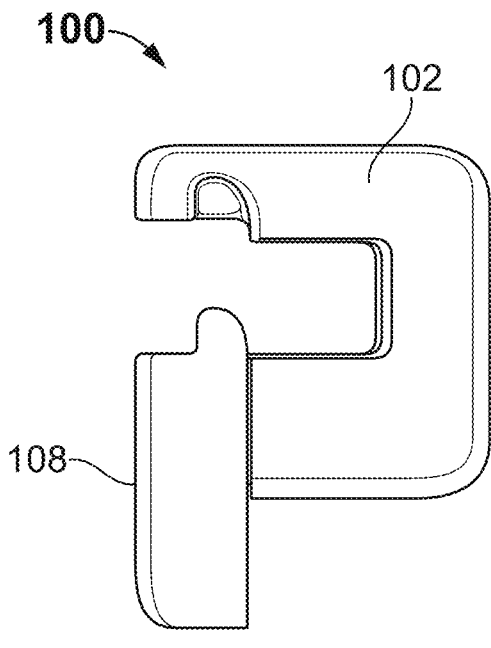
FIG. 7B exemplarily illustrates a schematic diagram of the proximal view of the bracket gate in the open position.

FIGS. 7A and 7B exemplarily illustrate a schematic diagram of the oblique view and proximal view of bracket gate 108 in the open position respectively.

Figure 8:
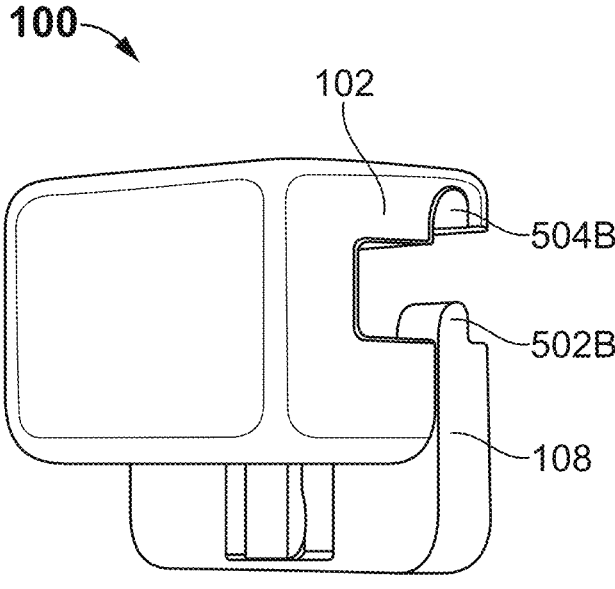
FIG. 8 exemplarily illustrates a schematic diagram of the lingual surface of the bracket gate of the bracket with the inclined plan on its internal surface as part of the interlocking mechanism.
Figures 10C, 10D, 10E:
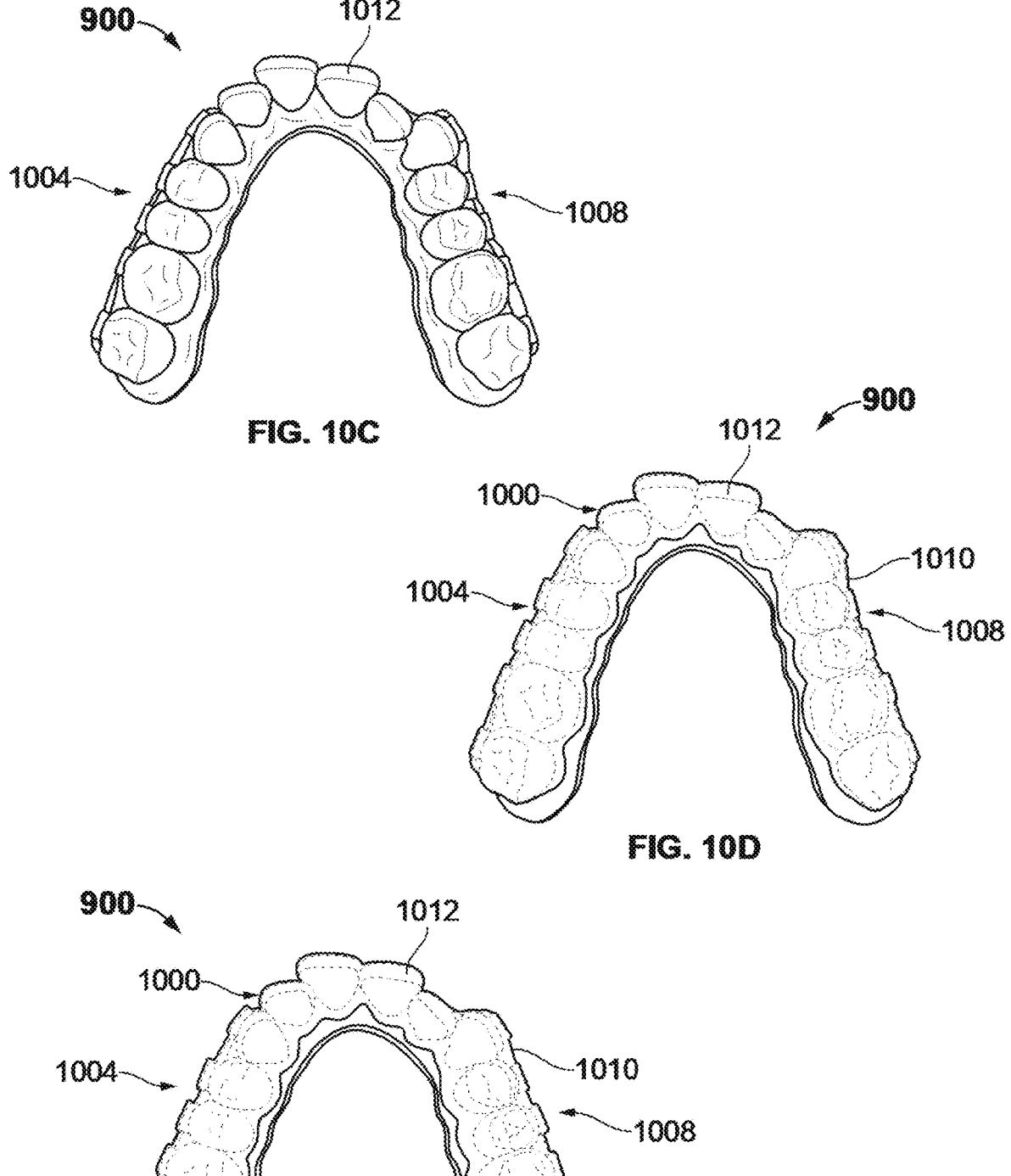
FIG. 10C exemplarily illustrates a schematic diagram of the occlusal view of the undercuts of the brackets and active wires blocked out in the three-dimensional model.
FIG. 10D exemplarily illustrates a schematic diagram of the occlusal view of the aligner formed on the intermediate 3D model with teeth movements planned.
FIG. 10E exemplarily illustrates a schematic diagram of the occlusal view of the canines and posterior teeth being aligned and leveled in the three-dimensional model and an aligner is formed on the model.

FIG. 8 exemplarily illustrates a schematic diagram of the lingual surface of the bracket gate 108 of the bracket 100 with the inclined plan on its internal surface as part of the interlocking mechanism.

The bracket body 102 has a lingual side and an occlusal side when bonded to a tooth carried by the user such as a patient's lower jaw of a gingival side, a mesial side, a distal side and a labial side. The lingual side of the bracket body 102 is configured to be secured to tooth in any conventional manner. For example, by an appropriate orthodontic cement or adhesive.

FIG. 9 exemplarily illustrates a schematic diagram of the occlusal view of the malocclusion model 900. The malocclusion model 900 is of any mal-relationship of dental arches with or without an irregularity of the teeth considered under a developmental disorder and a public dental health problem having high prevalence and treatment needs.

FIG. 10A to 10E illustrate a schematic diagram of the occlusal view of the self-ligated bracket-aligner orthodontic appliance 1000 implemented on the malocclusion model 900.

A bracket 100 is placed on the posterior teeth 1004 and canines 1006. The bracket 100 for orthodontic treatments in the posterior 1004 and canine 1006 tooth area comprises a bracket slot 104 directed in parallel to the base plate 1002 of the bracket and said bracket slot 104 is aligned in a manner that the slot 104 opening points towards the chewing or occlusal plane. An active wire 402 is placed on the posterior teeth 1004 and canines 1006, wherein the whole bracket body 102 is attached to the tooth by means of adhesive. The slot 104 preferably has a depth that is lower than its width. As an element for securing active wire 402 in the slot, said slot 104 is preferably covered by a bracket gate 108 which is stably held on the bracket body 102 in the opening and closing position. The active wire 402 inserted into bracket slot 104 is pressed by the closing spring against the slot 104 bottom and generates the forces on bracket 100 that are required for the tooth position correction. The use of safety lugs for the closing spring can be renounced which reduces the height of the bracket 100. A transfer guide 1016 is made on the malocclusion model 900 and the bracket 100 will be positioned inside the transfer guide 1016 and bonded to the teeth.

The active wire 402 will be placed inside the bracket slot 104 and the undercuts 1008 under the brackets 100 and around the active wire 402 will be blocked out in a three-dimensional model 1010. The teeth will be moved to their ideal position and the active wire 402 with its blocked-out medium around it will be adjusted according to the new position of the bracket 100. Each model will be 3D printed and an aligner 1012 will be formed on the model 1010 as described in many aligner systems (FIG. 10-12). A small part of the gingival surface of the bracket 100 will be blocked out and the fitness of the aligner 1012 around the bracket 100 will provide extra force and guide the teeth to their new position.

FIG. 11A to 11F illustrate a schematic diagram of the buccal view of the self-ligated bracket-aligner orthodontic appliance 1000 implemented on the malocclusion model 900.

Figure 11D:
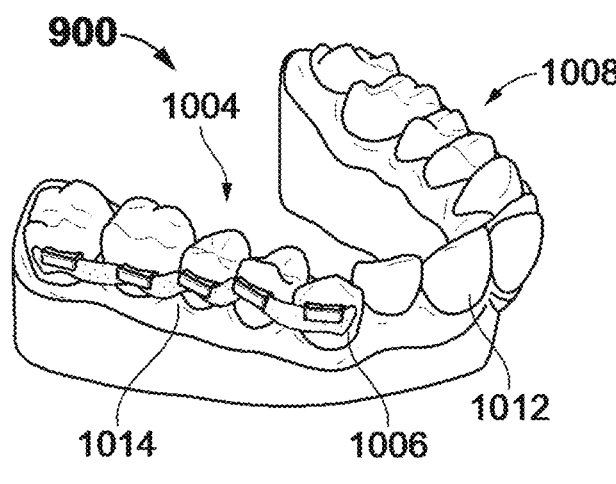
FIG. 11D exemplarily illustrates a schematic diagram of the buccal view of the undercuts of the brackets and active wires are blocked out in the three-dimensional model.
Figure 11E:
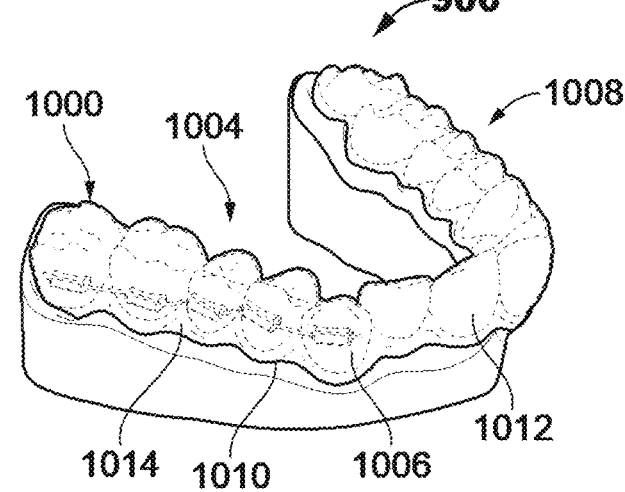
FIG. 11E exemplarily illustrates a schematic diagram of the buccal view of the aligner formed on the intermediate three-dimensional model with teeth movements planned.
Figure 11F:
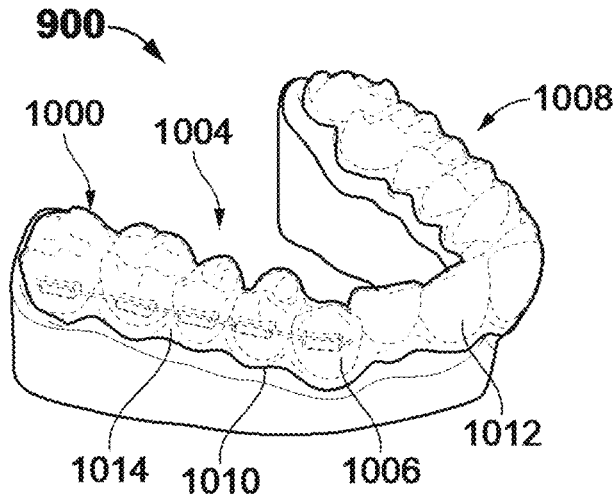
FIG. 11F exemplarily illustrates a schematic diagram of the buccal view of the canines and posterior teeth being aligned and leveled in the three-dimensional model and the aligner is formed on the model.

FIG. 11B illustrates a gingival transparent view of blocking out the undercut 1008 of brackets 100 and the active wire 402 between them as shown in FIG. 11C. The active wire 402 will be placed inside the bracket slot 104 and the undercuts 1004 under the brackets 100 and around the active wire 402 will be blocked out in a three-dimensional model 1010 as shown in FIG. 11D. The teeth will be moved to their ideal position and the active wire 402 with its blocked-out medium around it will be adjusted according to the new position of bracket 100. Each model will be 3D printed and an aligner 1012 will be formed on the model 1010 as shown in the FIGS. 11E and 11F. A small part of the gingival surface 1014 of the bracket 102 will be blocked out and the fitness of the aligner 1012 around the bracket 100 will provide extra force and guide the teeth to their new position.

Figure 12A:
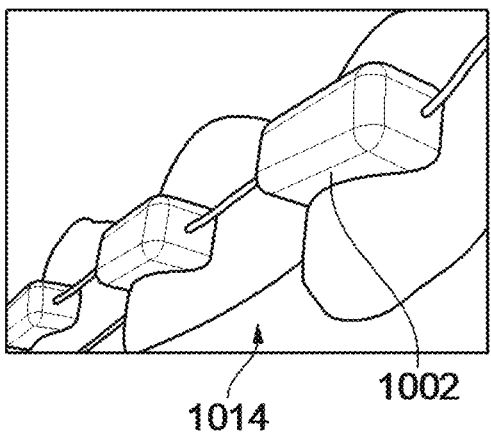
FIG. 12A exemplarily illustrates a schematic diagram of the gingival view of the brackets and the active wire between them.
Figure 12B:
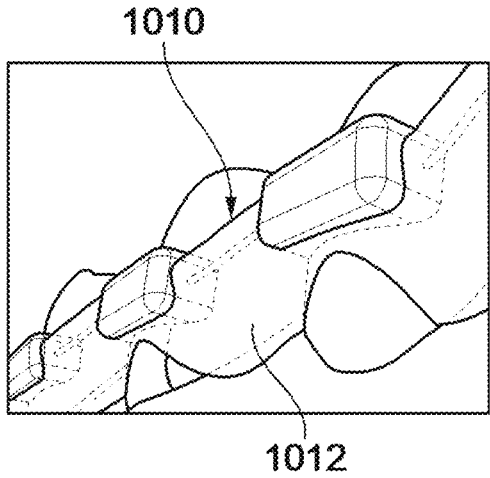
FIG. 12B exemplarily illustrates a schematic diagram of the gingival transparent view of blocking out the undercut of the brackets and the wire between them.
Figure 12C:
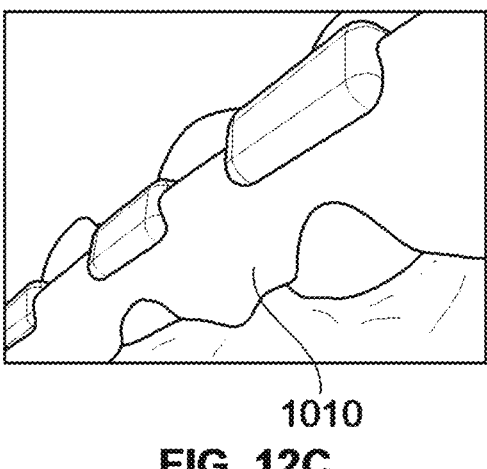
FIG. 12C exemplarily illustrates a schematic diagram of the gingival view of blocking out the undercut of the brackets and the wire between them.

FIG. 12A to 12C illustrate a schematic diagram of the gingival view of the self-ligated bracket-aligner appliance 1000 in which bracket 100 and the active wire 402 between them.

FIG. 12B illustrates a gingival transparent view of blocking out the undercut 1008 of brackets 100 and the active wire 402 between them. The active wire 402 will be placed inside the bracket slot 104 and the undercuts 1008 under the brackets 100 and around the active wire 402 will be blocked out in a three-dimensional model 1010 as shown in FIG. 12C. The teeth will be moved to their ideal position and the active wire 402 with its blocked-out medium around it will be adjusted according to the new position of bracket 100. Each model will be 3D printed and an aligner 1012 will be formed on the model 1010. A small part of the gingival surface 1014 of the bracket 102 will be blocked out and the fitness of the aligner 1012 around the bracket 100 will provide extra force and guide the teeth to their new position.

FIG. 13A to 13E illustrate a schematic diagram of the oblique view of distalization process of self-ligated bracket-aligner orthodontal appliance 1000.

Figure 13A:
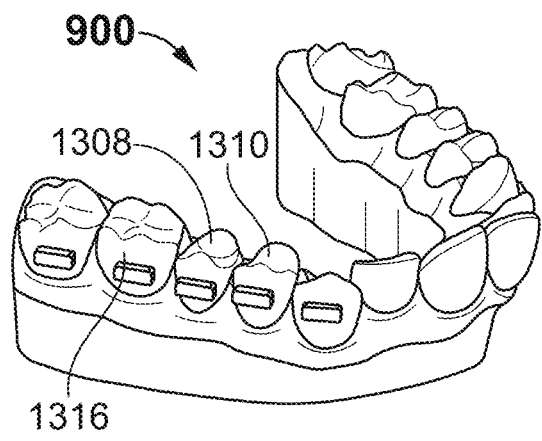
FIG. 13A exemplarily illustrates a schematic diagram of the oblique view of distalization stage in which teeth have already been aligned and leveled with all the brackets aligned straight.

FIG. 13A shows the posterior teeth 1004 have already been aligned and levelled with all the brackets 100 aligned straight. The bracket 100 is placed on the teeth using adhesive such as glue or cement with the bracket gate 108 in the open position.

Figure 13B:
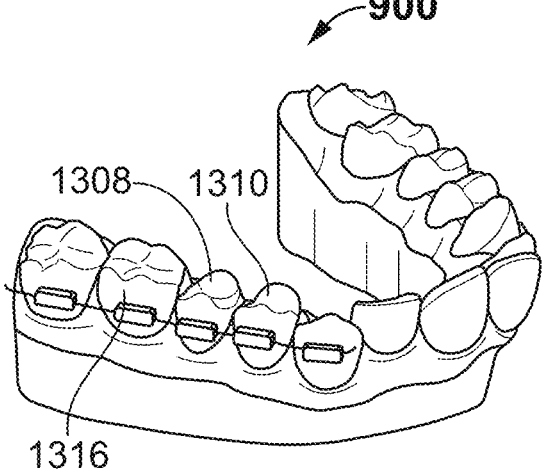
FIG. 13B exemplarily illustrates a schematic diagram of the oblique view of active wire has been inserted in the bracket slots.
Figure 13C:
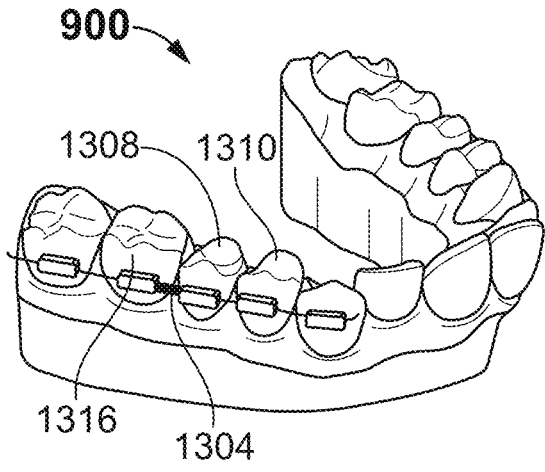
FIG. 13C exemplarily illustrates a schematic diagram of the oblique view of push coil being placed between the upper 2nd premolar and 1st molar.
Figure 13D:
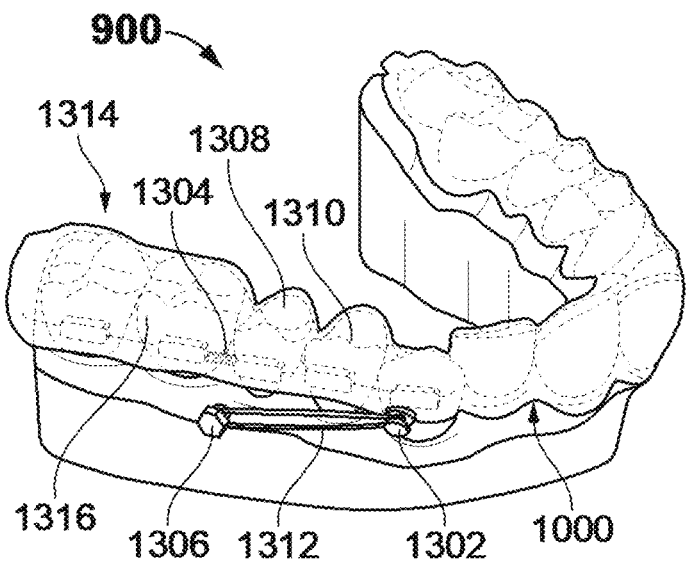
FIG. 13D exemplarily illustrates a schematic diagram of the oblique view of mini-screw placed mesial to the upper 1st molar to reinforce the anterior anchorage.
Figure 13E:
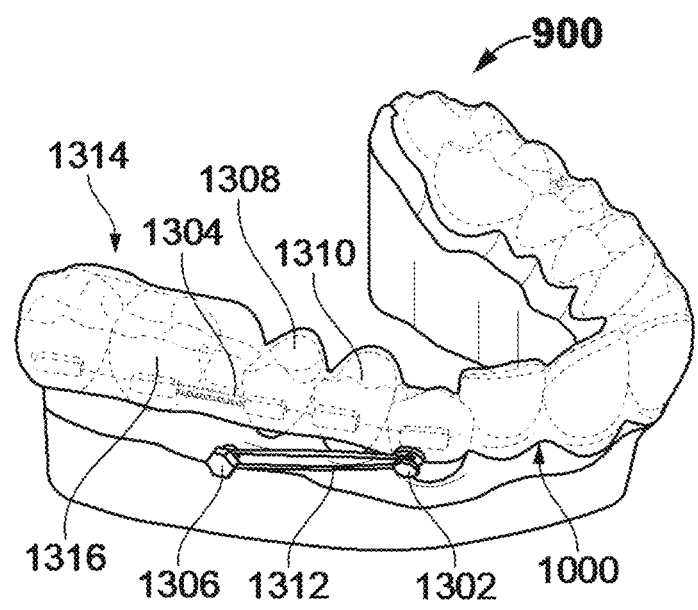
FIG. 13E exemplarily illustrates a schematic diagram of the oblique view of teeth being distalized by the push coil force as the anterior teeth have been maintained in position by the indirect anchorage provided by the mini-screw and button on the aligner.

In FIG. 13B, the active wire 402 is incorporated inside the bracket slot 104 and the undercuts 1008 under the bracket slot 104 is blocked-out for the active wire 402 inside the bracket slot 104. A push coil 1304 is placed between the upper $2^{nd}$ premolar 1316 and $1^{st}$ molar 1308 as shown in FIG. 13C. The push coils 1304 can apply the meso-distal force for the teeth movement to their ideal position. A mini-screw 1306 is placed mesial to the upper $1^{st}$ molar to reinforce the anterior anchorage and the aligner 1012 made on the three-dimensional model 1010 will guide the $1^{st}$ molar 1308 and 2nd molar 1310 as they are distalized by the push coil 1304 mesiodistal force as shown in the FIG. 13D.

The mini-screw 1306 combined with a ligature wire 1312 such as elastic can counteract the reactive force on the anterior segment (shown in FIG. 13,14). The same push coil 1304 and active wire 402 are intra-orally used to distalize the upper molars. The teeth have been distalized by the push coil 1304 force as the anterior teeth have been maintained in position by the indirect anchorage provided by the mini-screw 1306 and button 1302 on the aligner 1012 as shown in the FIG. 13E. The guidance of the gingival 1014 and occlusal surfaces 1314 of the self-ligating brackets 100 with stiffness of the active wire 402 in the edgewise bracket slot 104 is responsible for a movement on the teeth resulting in bodily movement of the teeth.

FIG. 14A to 14D illustrate a schematic diagram of the occlusal view of the distillation process of self-ligated bracket-aligner orthodontal appliance 1000.

Figures 14A, 14B:
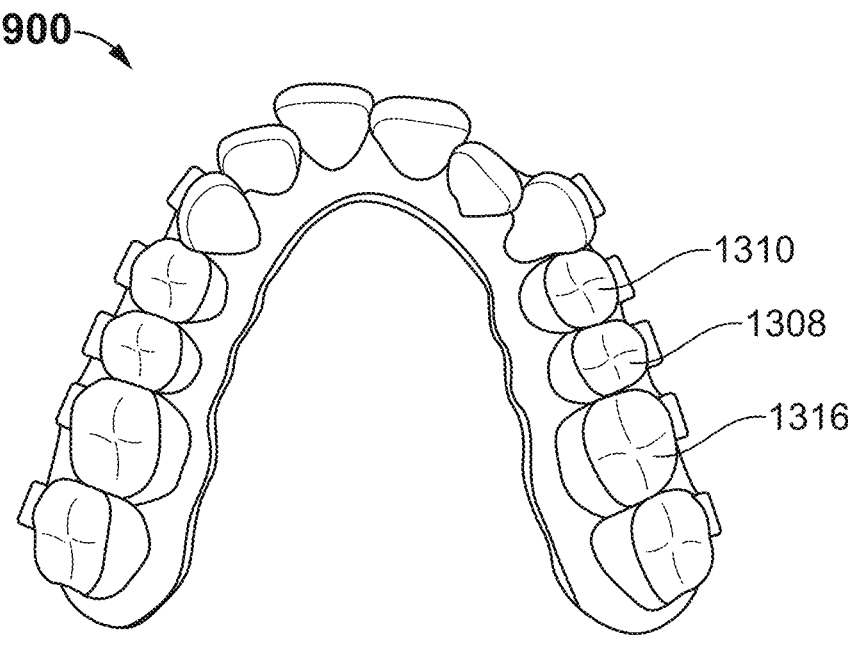
FIG. 14A exemplarily illustrates a schematic diagram of the occlusal view distalization stage in which post teeth have already been aligned and leveled with the brackets aligned straight.
FIG. 14B exemplarily illustrates a schematic diagram of the occlusal view active wire has been inserted in the bracket slots.
Figure 14C:
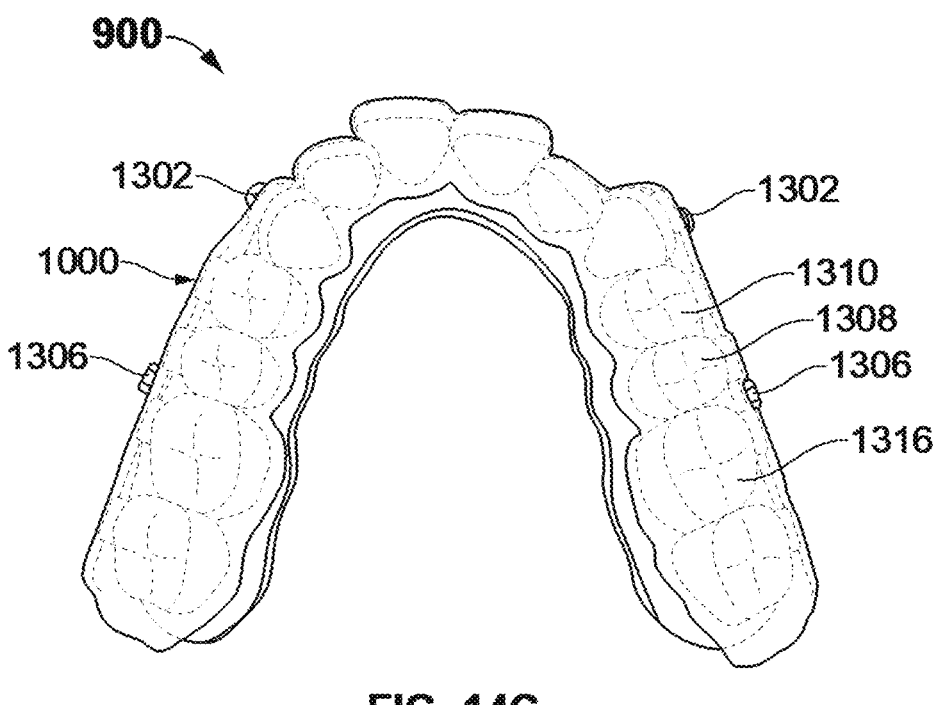
FIG. 14C exemplarily illustrates a schematic diagram of the occlusal view of mini-screw placed mesial to the upper 1st molar to reinforce the anterior anchorage.

FIG. 14A shows the posterior teeth 1004 have already been aligned and leveled with all the brackets 100 aligned straight. The bracket 100 is placed on the teeth using adhesive such as glue or cement with the bracket gate 108 in the open position.

In FIG. 14B, the active wire 402 is incorporated inside the bracket slot 104 and the undercuts 1008 under the bracket slot 104 is blocked-out for the active wire 402 inside the bracket slot 104. The removable push coil 1304 is placed between upper $2^{nd}$ premolar 1308 and $1^{st}$ molar 1316. The push coils 1304 can apply the meso-distal force for the teeth movement to their ideal position. The mini-screw 1306 is placed mesial to the upper $1^{st}$ molar 1316 to reinforce the anterior anchorage and the aligner 1012 made on the three-dimensional model 1010 will guide the $1^{st}$ molar 1316 and 2nd premolar 1308 as they are distalized by the push coil 1304 mesiodistal force as shown in the FIG. 14C.

Figure 14D:
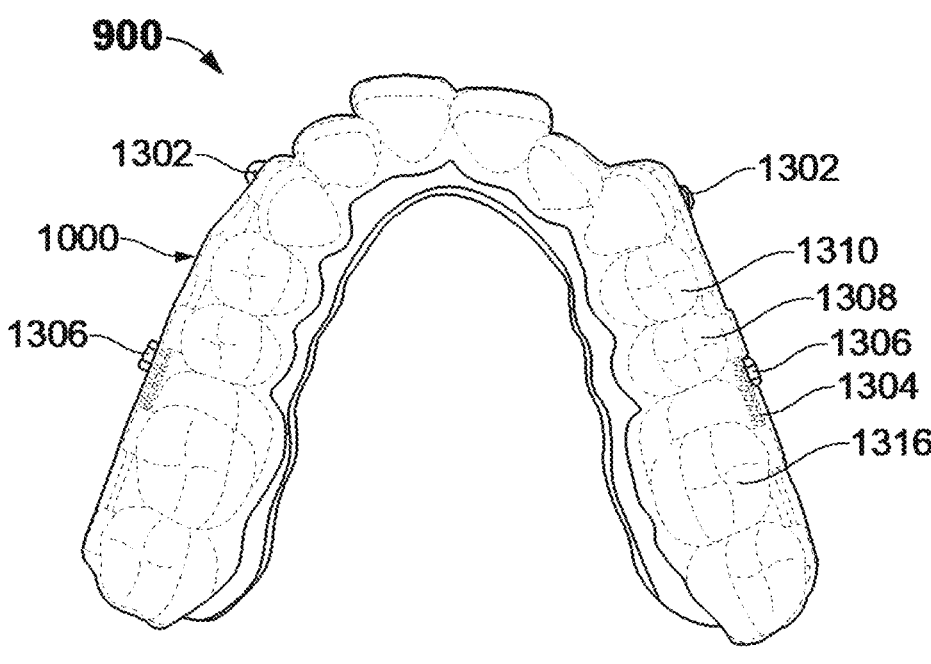
FIG. 14D exemplarily illustrates a schematic diagram of the occlusal view of teeth being distalized by the push coil force as the anterior teeth to maintained in position by the indirect anchorage provided by the mini-screw and button on the aligner.

The mini-screw 1306 combined with a ligature wire 1312 such as elastic can counteract the reactive force on the anterior segment (shown in FIG. 13,14). The same push coil 1304 and active wire 402 are intra-orally used to distalize the upper molars. The teeth have been distalized by the push coil 1304 force as the anterior teeth have been maintained in position by the indirect anchorage provided by the mini-screw 1306 and button 1302 on the aligner 1012 as shown in the FIG. 14D. The guidance of the gingival 1014 and occlusal surfaces 1314 of the self-ligating brackets 100 with stiffness of the active wire 402 in the edgewise bracket slot 104 is responsible for a movement on the teeth resulting in bodily movement of the teeth.

FIG. 15A to 15E illustrate a schematic diagram of the oblique view of the distalization process of the self-ligated bracket-aligner orthodontal appliance 1000.

FIG. 15A shows the posterior teeth 1004 have already been aligned and leveled with all the brackets 100 aligned straight. The bracket 100 is placed on the teeth using adhesive such as glue or cement with the bracket gate 108 in the open position.

The active wire 402 is incorporated inside the bracket slot 104 and the undercuts 1008 under the bracket slot 104 is blocked-out for the active wire 402 inside the bracket slot 104. The removable push coil 1304 is placed between $1^{st}$ premolar 1310 and canine 5018 as shown in the FIG. 15B. The push coils 1304 can apply the meso-distal force for the teeth movement to their ideal position. The mini-screw 1306 is placed mesial to the $1^{st}$ premolar 1310 to reinforce the anterior anchorage and the aligner 1012 made on the three-dimensional model 1010 will guide the $1^{st}$ premolar 1310 and $2^{nd}$ premolar 1308 as they are distalized by the push coil 1304 mesiodistal force as shown in the FIG. 15C.

Figure 15D:
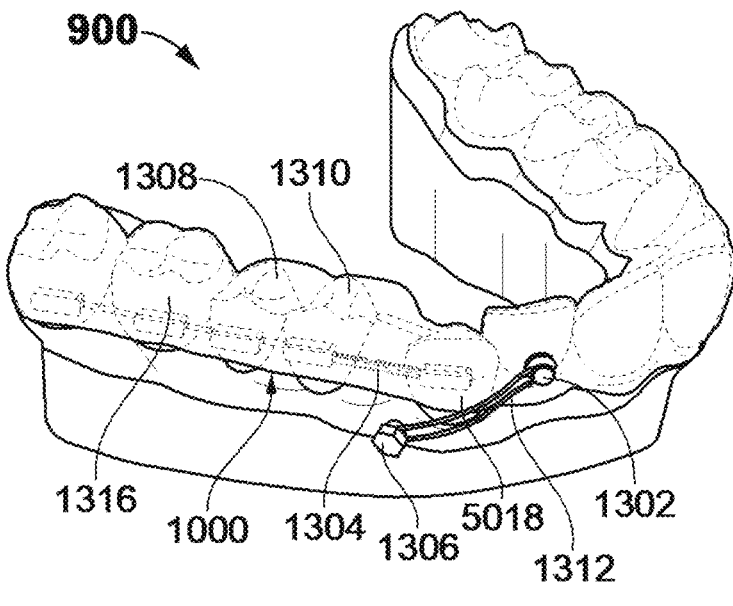
FIG. 15D exemplarily illustrates a schematic diagram of the oblique view of premolars being distalized by the push coil force as the anterior teeth have been maintained in position by the indirect anchorage provided by the mini-screw and button on the aligner.
Figure 15E:
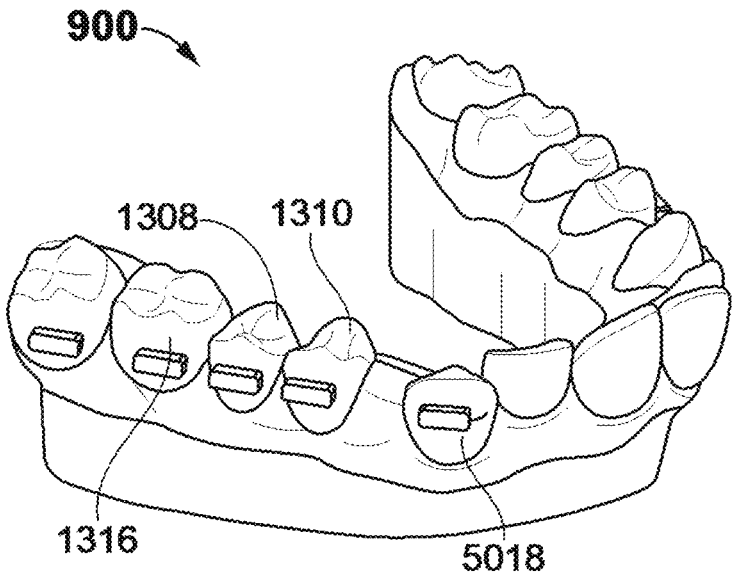
FIG. 15E exemplarily illustrates a schematic diagram of the oblique view of space distal to canines can be used to align and retract the anterior teeth by aligners.

The mini-screw 1306 combined with a ligature wire 1312 such as elastic can counteract the reactive force on the anterior segment (shown in FIG. 13,14). The same push coil 1304 and active wire 402 are intra-orally used to distalize the upper molars. The teeth have been distalized by the push coil 1304 force as the anterior teeth have been maintained in position by the indirect anchorage provided by the mini-screw 1306 and button 1302 on the aligner 1012 as shown in the FIG. 15D. The guidance of the gingival 1014 and occlusal surfaces 1314 of the self-ligating brackets 100 with stiffness of the active wire 402 in the edgewise bracket slot 104 is responsible for a movement on the teeth resulting in bodily movement of the teeth. Referring to the FIG. 15E shows the space distal to canines can be used to align and retract the anterior teeth by aligners.

FIG. 16A to 16D illustrate a schematic diagram of the oblique view of the distalization process of the self-ligated bracket-aligner orthodontal appliance 1000.

Figure 16A:
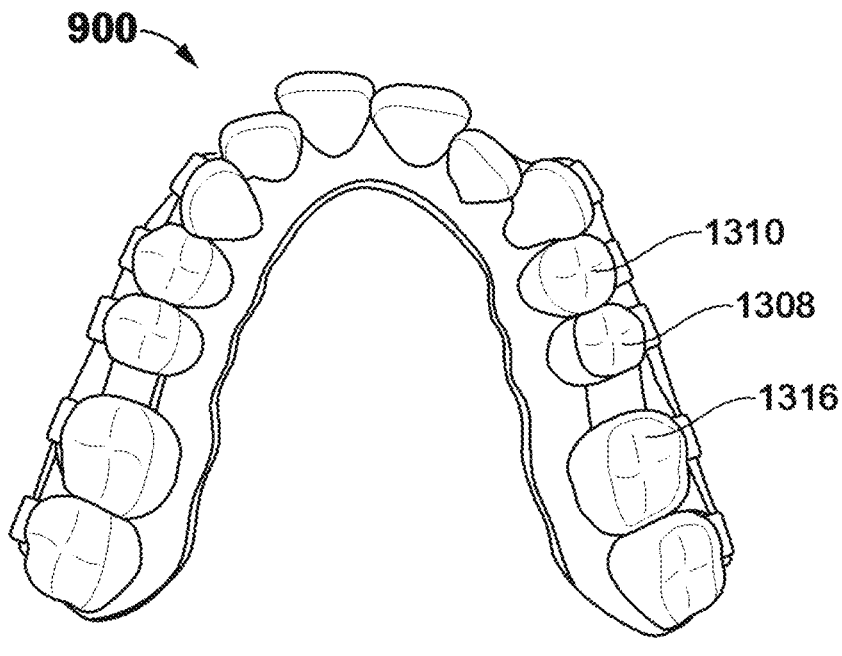
FIG. 16A exemplarily illustrates a schematic diagram of the occlusal view of distalization process of premolars in which posterior teeth have been aligned and levelled.
Figure 16B:
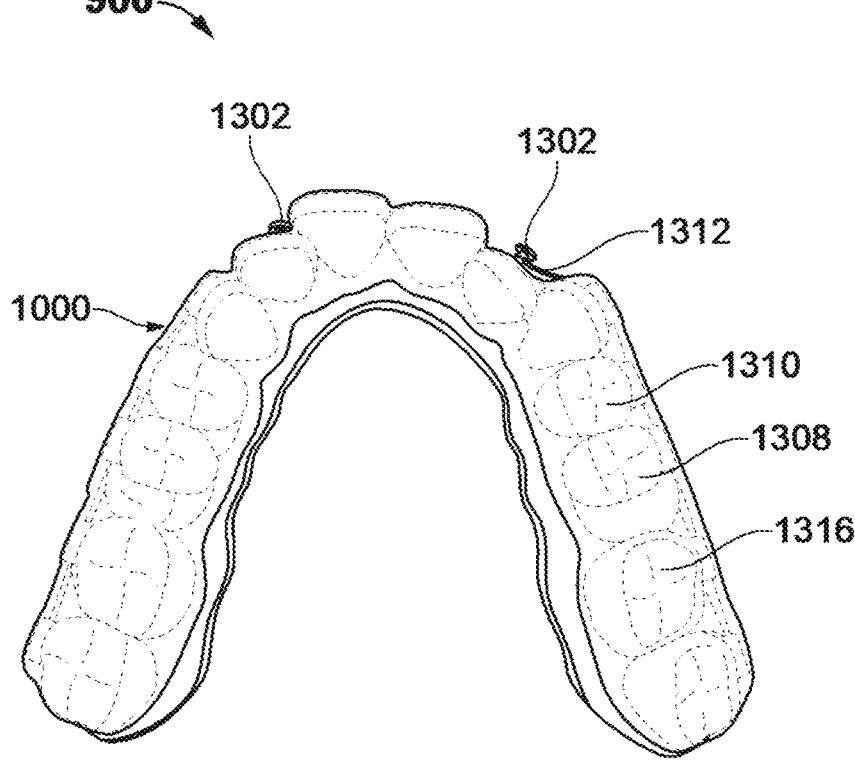
FIG. 16B exemplarily illustrates a schematic diagram of the occlusal view of mini-screw is placed mesial to the upper 1st premolar to reinforce the anterior anchorage.
Figure 16C:
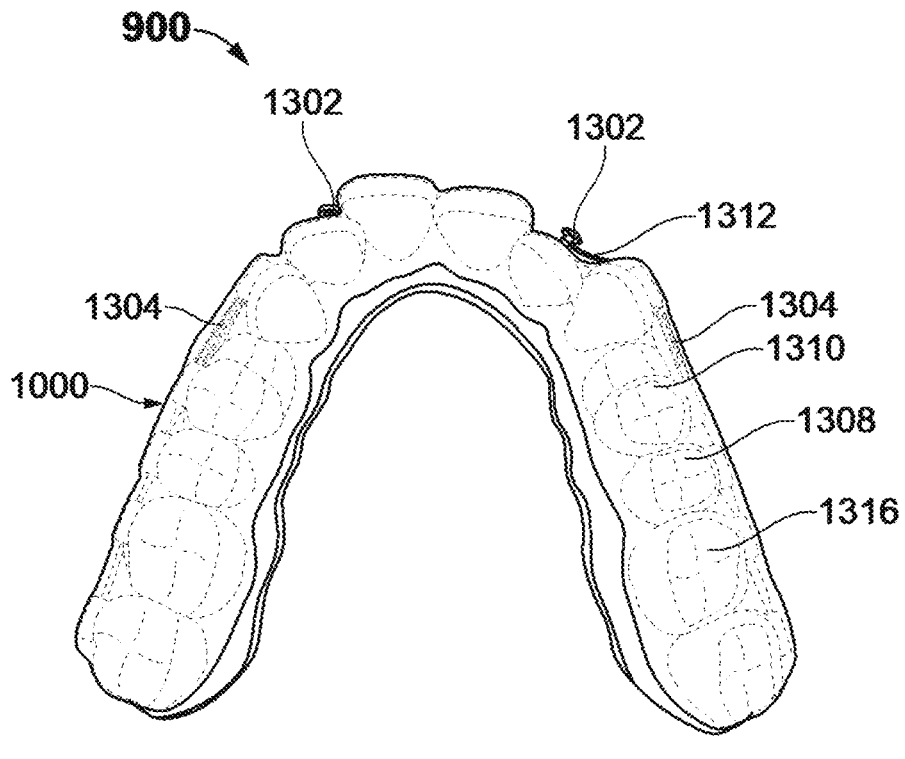
FIG. 16C exemplarily illustrates a schematic diagram of the occlusal premolars being distalized by the push coil force as the anterior teeth have been maintained in position by the indirect anchorage provided by the mini-screw and button on the aligner.

FIG. 16A shows the posterior teeth 1004 have already been aligned and leveled with all the brackets 100 aligned straight. The bracket 100 is placed on the teeth using adhesive such as glue or cement with the bracket gate 108 in the open position.

The active wire 402 is incorporated inside the bracket slot 104 and the undercuts 1008 under the bracket slot 104 is blocked-out for the active wire 402 inside the bracket slot 104. The removable push coil 1302 is placed between $1^{st}$ premolar 1310 and canine 5018. The push coils 1302 can apply the meso-distal force for the teeth movement to their ideal position as shown in the FIG. 16A. The mini-screw 1306 is placed mesial to the $1^{st}$ premolar to reinforce the anterior anchorage and the aligner 1012 made on the three-dimensional model 1010 will guide the $1^{st}$ premolar molar 1310 and $2^{nd}$ premolar 1308 as they are distalized by the push coil 1304 mesiodistal force as shown in the FIG. 16B.

The mini-screw 1306 combined with a ligature wire 1312 such as elastic can counteract the reactive force on the anterior segment (shown in FIG. 13, 14). The same push coil 1304 and active wire 402 are intra-orally used to distalize the upper molars. The teeth have been distalized by the push coil 1304 force as the anterior teeth have been maintained in position by the indirect anchorage provided by the mini-screw 1306 and button 1302 on the aligner 1012 as shown in the FIG. 16C.

Figure 16D:
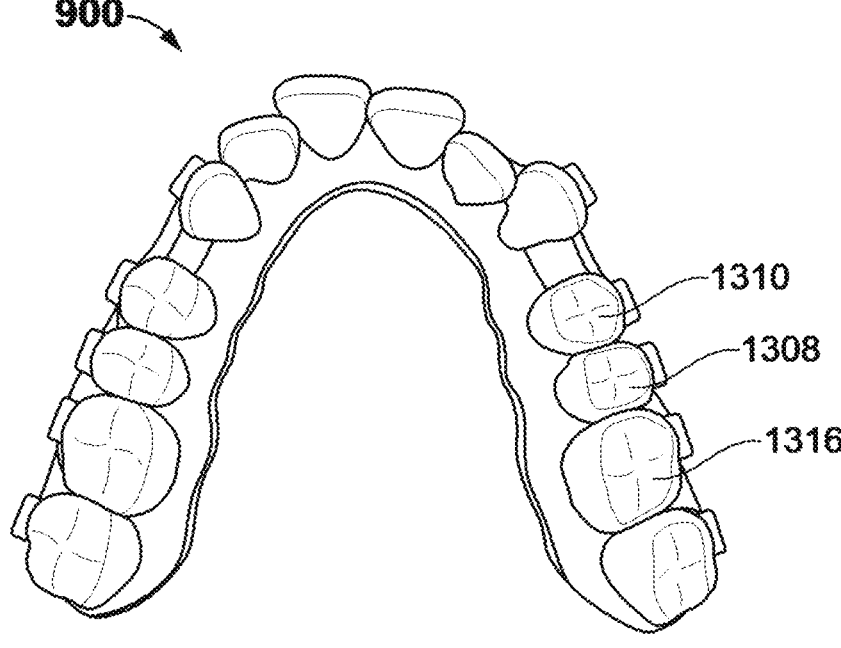
FIG. 16D exemplarily illustrates a schematic diagram of the oblique view of space distal to canines can be used to align and retract the anterior teeth by aligners.

The guidance of the gingival 1014 and occlusal surfaces 1314 of the self-ligating brackets 100 with stiffness of the active wire 402 in the edgewise bracket slot 104 is responsible for a movement on the teeth, resulting in bodily movement of the teeth. Referring to the FIG. 16D shows the space distal to canines can be used to align and retract the anterior teeth by aligners.

FIGS. 17A and 17B illustrate a schematic diagram of buccal and mesial view of bracket 100 with occlusal wing 1702 and gingival wing 1704 respectively. As an embodiment, in the appliance 1000 can place the brackets 100 in the horizontal direction and use them as aligner attachments on all the teeth. Suppose in the case of the user such as a dental patient's cooperation is not satisfactory during the treatment there is a need of sectional or continuous active wires during the treatment from a biochemical perspective. In that situation, active wires 402 can be used without adding any changes to them. The appliance 1000 comprises two occlusal wing 1702 and gingival wing 1704 with vertical slots 1706 to the bracket 100 to make using other orthodontic auxiliaries like elastic modules and hooks possible. Together with customizing the bracket base, this appliance has the potential to improve the results of orthodontic treatment significantly.

FIGS. 17C and 17D illustrate a schematic diagram of occlusal and oblique view of bracket 100 with occlusal wing 1702 and gingival wing 1704 respectively. The vertical slot 1706 is incorporated into the bracket to add the active wire 402 without any changes in them for orthodontal treatment.

FIG. 17E illustrates a gingival view of bracket 100 with gingival wing 1704 alone as an embodiment.

FIG. 17F illustrates a schematic diagram of the buccal boundary of the vertical slot 1706 is flush with the horizontal slot 1708 and can incorporate active wire 402 in the vertical slot 1706 during the orthodontic treatment.

FIG. 17G illustrates a schematic diagram of the buccal view of the bracket 100 with bracket gate 108 is in the open position.

The combined self-ligating bracket-aligner orthodontic appliance is specially designed for self-ligating brackets providing outer surfaces for the aligner attachments. At the same time, the edgewise bracket slot can accelerate the tooth movement in the alignment and leveling stage of treatment to enhance bodily mesiodistal movement and torque control based on the classic biomechanical principles of orthodontics.

One of the clinical applications of this appliance is described in detail to distalize the teeth using temporary anchorage devices. This orthodontic appliance can distalize the teeth using a mini-screw and just one aligner designed by superimposing incremental models of the teeth used for distalization. In this way, one of the limitations of aligners alone which is prolonging the treatment because of the large number of aligners needed during the distalization stage can be overcome.

In other application, can place the brackets in the horizontal direction and use them as aligner attachments on all the teeth. Suppose a patient's cooperation is not satisfactory during the treatment and there is a need of sectional or continuous active wires during the treatment from a biochemical perspective. In that situation, active wires can be used without adding any changes. As another application, the appliance 1000 comprises two occlusal and gingival wings with vertical slots to the bracket to make using other orthodontic auxiliaries like elastic modules and hooks possible. The appliance 1000 has the potential to improve the results of orthodontic treatment significantly.

The foregoing description comprises illustrative embodiments of the present disclosure. Having thus described exemplary embodiments of the present disclosure, it should be noted by those skilled in the art that the within disclosures are exemplary only, and that various other alternatives, adaptations, and modifications may be made within the scope of the present disclosure. Merely listing or numbering the steps of a method in a certain order does not constitute any limitation on the order of the steps of that method.

Many modifications and other embodiments of the disclosure will come to mind to one skilled in the art to which this disclosure pertains having the benefit of the teachings presented in the foregoing descriptions. Although specific terms may be employed herein, they are used only in generic and descriptive sense and not for purposes of limitation. Accordingly, the present disclosure is not limited to the specific embodiments illustrated herein. While the above is a complete description of the preferred embodiments of the disclosure, various alternatives, modifications, and equivalents may be used. Therefore, the above description and the examples should not be taken as limiting the scope of the disclosure, which is defined by the appended claims.

The invention claimed is:

1. A combined self-ligating bracket-aligner orthodontic appliance, comprising:
   at least one self-ligating bracket configured to attach to a tooth having:
   a body portion having a rear side proximal to a gumline, a front side opposite to the rear side, a top side, a bottom side opposite to the top side and two opposing side edges;
   an archwire slot formed transversely across the body portion from the first side of the body portion to an interior portion of the body portion, and across the two opposing side edges, and
   a gate disposed at the front side across the slot to open and close the slot the front side of the self-ligating bracket; and
   at least one aligner placed above the self-ligating bracket, wherein an outer surface of the self-ligating bracket is geometrically designed to minimize undercuts and holes, thereby allowing the self-ligating bracket to serve as a direct attachment site for the at least one aligner, wherein the self-ligating bracket functions both as a customized orthodontic bracket and as an aligner attachment, such that the at least one aligner is designed to engage directly with the outer surface of the self-ligating bracket, applying continuous force without passive enclosing over the self-ligating bracket, wherein the self-ligating bracket is configured to resemble conventional box attachments commonly used in aligner therapy, allowing for improved fit, engagement, and force transmission by the aligner; wherein the self-ligating bracket design enables its fabrication through 3D printing as a two-piece structure consisting of a bracket body and a gate or a cap, ensuring tooth-specific customization and biomechanical precision, and at least one aligner adapted to be placed in direct contact with and engage the external surfaces of the self-ligating bracket to guide tooth movement.

2. The orthodontic appliance of claim 1, wherein the archwire slot has a rectangular cross section.

3. The orthodontic appliance of claim 1, wherein the bracket is made of a tooth-colored biocompatible plastic or composite.

4. The orthodontic appliance of claim 1, wherein the gate comprises an interior surface contacting the front side of the bracket, wherein the gate comprises a slot at the interior surface and a front side of the bracket comprises a protrusion complementary to the slot to enable the gate to slide over the front side of the bracket to open and close the archwire slot.

5. The orthodontic appliance of claim 4, wherein the slot and protrusion have a T-shaped configuration.

6. The orthodontic appliance of claim 4, wherein the slot having a first depth at a top portion of the slot and a second depth at a bottom portion of the slot, wherein the first depth is smaller than the second depth, and wherein the bracket further comprises an active, flexible cantilever spring formed over the protrusion.

7. The orthodontic appliance of claim 6, wherein the cantilever spring is made of Nickel-Titanium (NiTi) material or any flexible material.

8. The orthodontic appliance of claim 6, wherein, when the gate is slid downwards to open the transverse slot, the top portion having the first depth configured to flex the cantilever spring holds the gate in open portion.

9. The orthodontic appliance of claim 8, wherein, when the gate is slid upwards to close the transverse, the bottom portion having the second depth enable to relax and extend the cantilever spring, while a protuberance at the top portion of the slot lies over the cantilever spring enabling it to close the gate.

10. The orthodontic appliance of claim 1, further comprises at least two spaced apart ridges extends from a top side of the gate and at least two spaced apart grooves formed at a top interior side of the body portion, wherein the ridges are complementary to the grooves, wherein the ridges are configured to interlock with the grooves to provide stabilization to gate when the gate is closed.

11. The orthodontic appliance of claim 1, further comprises at least one occlusal wing extends from the top side of the body portion.

12. The orthodontic appliance of claim 1, further comprises at least one gingival wing extends from a bottom side of the body portion.

13. The orthodontic appliance of claim 1, further comprises a vertical slot to use orthodontic auxiliaries.

14. The orthodontic appliance of claim 1, wherein the orthodontic auxiliaries include elastic modules and hooks.

15. The orthodontic appliance of claim 1, wherein the self-ligating bracket is configured to operate as a standalone aligner attachment, the self-ligating bracket being directly engageable by an orthodontic aligner to transmit orthodontic forces to a tooth independently of any archwire, such that no archwire is received within or retained by a bracket slot during force application.

16. The orthodontic appliance of claim 1, wherein the gingival surface and the occlusal surface of the self-ligating bracket are geometrically configured to establish indexed engagement with complementary internal surfaces of an orthodontic aligner, such engagement producing a defined force-moment system between the aligner and the bracket, wherein the internal surface of the aligner applies counter-moments through contact with the external surfaces and these surfaces of the bracket provides a reaction interface, thereby enabling controlled, bodily distalization of the tooth during a distalization stage.

* * * * *